United States Patent
Patel et al.

(10) Patent No.: US 7,478,753 B2
(45) Date of Patent: Jan. 20, 2009

(54) SYSTEM AND METHOD FOR AIMING AN OPTICAL CODE SCANNING DEVICE

(75) Inventors: Mehul Patel, Fort Salonga, NY (US); Christopher Brock, Manorville, NY (US); Miroslav Trajkovic, Coram, NY (US); Edward Hatton, Peterborough (CA); William Sackett, Rocky Point, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 299 days.

(21) Appl. No.: 10/931,150

(22) Filed: Aug. 31, 2004

(65) Prior Publication Data

US 2006/0043191 A1    Mar. 2, 2006

(51) Int. Cl.
*G06K 5/04* (2006.01)
*G06K 7/10* (2006.01)
*G06K 9/32* (2006.01)

(52) U.S. Cl. ............................ 235/462.08; 235/462.2

(58) Field of Classification Search ............ 235/462.06, 235/462.07, 462.08, 462.09, 462.12, 462.22, 235/462.31, 462.2, 462.32
See application file for complete search history.

(56) References Cited

U.S. PATENT DOCUMENTS

| | | | |
|---|---|---|---|
| 5,155,343 A * | 10/1992 | Chandler et al. | 235/462.09 |
| 5,365,597 A * | 11/1994 | Holeva | 382/318 |
| 5,756,981 A * | 5/1998 | Roustaei et al. | 235/462.42 |
| 5,786,582 A * | 7/1998 | Roustaei et al. | 235/462.07 |
| 5,811,774 A | 9/1998 | Ju et al. | |
| 5,955,720 A | 9/1999 | He et al. | |
| 6,060,722 A | 5/2000 | Havens et al. | |
| 2003/0222147 A1 * | 12/2003 | Havens et al. | 235/462.45 |
| 2004/0020990 A1 * | 2/2004 | Havens et al. | 235/472.01 |

FOREIGN PATENT DOCUMENTS

WO          WO 99/64980        12/1999
WO  PCT/US2005/029818    12/2005

OTHER PUBLICATIONS

PCT Internl. Search Rpt., Apr. 6, 2006, PCT/US2005/029818, Symbol Tech.

* cited by examiner

*Primary Examiner*—Kumiko C Koyama
(74) *Attorney, Agent, or Firm*—Carter, DeLuca, Farrell & Schmidt, LLP (57) ABSTRACT

A system and method for performing a read operation including acquiring a series of frames of image data; processing a first frame of image data including an array of pixel data acquired while an aiming pattern was generated for determining a location L of at least one pixel of the array of pixel data that corresponds to the aiming pattern; and processing a second frame of image data acquired while the aiming pattern was not generated. The processing of the second frame of image data includes the steps of selecting at least one optical code acquired in the second frame of image data that is located at a respective location; wherein the respective location meets a predetermined condition relative to the determined location L; and providing the selected at least one optical code for further processing in accordance with the read operation.

25 Claims, 5 Drawing Sheets

SYSTEM AND METHOD FOR AIMING AN OPTICAL CODE SCANNING DEVICE

BACKGROUND OF THE INVENTION

1. Field of the Invention

This invention relates to optical code readers. In particular, this invention relates to a system and method for aiming an optical code scanning device at a selected optical code.

2. Description of the Prior Art

Optical code scanner systems have been developed heretofore for reading optical codes such as bar code symbols appearing on a label or on a surface of an article. The symbol itself is a coded pattern of indicia comprised of, for example, a series of bars of various widths spaced apart from one another to bound spaces of various widths, where the bars and spaces having different light reflecting characteristics. The scanning devices in scanning systems electro-optically transform the graphic indicia into electrical signals, which are decoded into alphanumeric characters that are intended to be descriptive of the article or some characteristic thereof. Such characters are typically represented in digital form and utilized as an input to a data processing system for applications in point-of-sale processing, inventory control and the like.

Optical code scanning devices are used in both fixed and portable installations in many diverse environments, such as in stores for check-out services, in manufacturing locations for work flow and inventory control, and in transport vehicles for tracking package handling. The scanning device can be used for rapid data entry, such as by scanning a target barcode from a printed listing of many barcodes. In some uses, the optical code scanning device is connected to a portable data processing device or a data collection and transmission device. Frequently, the optical code scanning device is a handheld scanning device including a handheld sensor which is manually directed at a target code.

Often an individual scanning device is a component of a much larger system including other scanning devices, computers, cabling, data terminals, etc. Such systems are frequently designed and constructed on the basis of mechanical and optical specifications for the scanning engine, sometimes called "form factors". One such form factor is the SE1200 form factor designed by Symbol Technologies, Inc.

One type of optical code scanning device is an array optical imager scanning device, which includes an image sensor having a one- or two-dimensional array of cells or photo sensors, such as an area charge coupled device (CCD). The imager scanning device images a target, including sensing light reflected off a target being imaged and generating a plurality of electrical signals corresponding to the sensing which correspond to a two-dimensional array of pixel information describing the field of view of the scanning device. The electrical signals are then processed and provided to decode circuitry for decoding thereof. The imager sensor includes associated circuitry for generating and processing the electrical signals. In addition, a lens assembly may be provided for focusing light incident on the image sensor.

When multiple optical codes are in the field of view (FOV) of the scanning device, the scanning device typically determines which optical code is the easiest to capture and/or read, and that optical code is decoded first. The user does not control which optical code the system should try to decode, and accordingly may have difficulty scanning a desired optical code.

Scanning devices are often equipped with an aiming assembly which generates a visible aiming pattern, such as a "cross hair" pattern, which a user may train on a target object to be imaged in order to aim the scanning device at the target image. In commercially available imaging devices it is common for the center of the aiming pattern to not coincide with the center of the field of view of the scanning device due to mechanical or manufacturing inconsistencies, including the displacement between a light source of the aiming assembly and a focal point of optics for focusing light onto the image sensor. The user may use the aiming pattern to scan a desired code that is presented together with multiple optical codes, such as on a page having one or more columns of optical codes. The user may try to align the center of the aiming pattern to coincide with or be nearest to the desired code and then activate a scanning operation, such as by pulling a trigger.

Upon activation of the scanning operation, the scanning device temporarily disables generation of the aiming pattern so that the aiming pattern is not incorporated into the image being acquired in order not to obstruct a target being imaged. The actual position of the aiming pattern in the acquired image is not necessarily in the center of the acquired image. In fact, the actual position of the aiming pattern is not known. The desired optical code is not necessarily the acquired optical code that is closest to the center of the acquired image. Accordingly, there is not a reliable way to determine which optical code of the multiple optical codes lying within the field of view of the scanning device is the desired optical code.

Accordingly, there is a need for a system and method for aiming an optical code scanning device at a desired optical code of multiple optical codes in the field of view of the scanning device for decoding the desired optical code.

SUMMARY OF THE INVENTION

In accordance with the present invention, an optical code scanning device system is provided for reading at least one optical code, the system including an imager module for acquiring a series of at least one frame of image data, image data of respective frames including an array of pixel data corresponding to imaging of a field of view of the imager module; an aiming assembly having at least one light source for generating at least one beam forming an aiming pattern visible in the field of view; and an aiming controller for controlling the aiming assembly for controlling generation of the aiming pattern during acquisition of at least one frame of image data in response to receipt of an actuation signal indicating initiation of a read operation. The system further includes an optical code selector module executable on at least one processor for processing of at least a portion of a first frame of image data acquired while the aiming pattern was generated in accordance with a read operation for determining a location L of at least one pixel of the array of pixel data that corresponds to the aiming pattern. The optical code selector module further processes at least a portion of a second frame of image data of the at least one frame of image data acquired while the aiming pattern was not generated, including selecting at least one optical code acquired in the acquired image data that is located at a respective location, wherein the respective location meets a predetermined condition relative to the determined location L. The optical code selector module further provides the selected at least one optical code for further processing in accordance with the read operation.

In another embodiment of the invention an optical code scanner system is provided including an imager module; an aiming assembly; a range finder module for determining a distance between the scanner system and at least one optical code being imaged; and a parallax range module for determining a location L of at least one pixel of the array of pixel data that corresponds to the aiming pattern in accordance with the distance determined by the range finder module. The system further includes an optical code selector module executable on at least one processor for processing at least a portion of a frame of image data acquired during a read operation while the aiming pattern was generated including selecting at least one optical code acquired in the acquired image data that is located at a respective location, wherein the respective location determined during the read operation meets a predetermined condition relative to the location L. The optical code selector module further, provides the selected at least one optical code for further processing in accordance with the read operation.

In an alternate embodiment of the invention, a method is provided for reading at least one optical code including the steps of: imaging a field of view including acquiring a series of at least one frame of image data, image data of respective frames including an array of pixel data corresponding to a field of view of the imaging; generating at least one beam forming an aiming pattern visible in the field of view; controlling generation of the aiming pattern during acquisition of at least one frame of image data in response to receipt of an actuation signal indicating initiation of a read operation; and performing a read operation. The performance of the read operation includes the steps of: processing at least a portion of a first frame of image data acquired while the aiming pattern was generated for determining a location L of at least one pixel of the array of pixel data that corresponds to the aiming pattern; and processing at least a portion of a second frame of image data of the at least one frame of image data acquired while the aiming pattern was not generated. Performance of the read operation further includes the steps of selecting at least one optical code acquired in the acquired image data that is located at a respective location; wherein the respective location meets a predetermined condition relative to the determined location L; and providing the selected at least one optical code for further processing in accordance with the read operation.

In yet another embodiment of the invention a method is provided for reading at least one optical code including the steps of: imaging with a scanning system a field of view including acquiring a series of at least one frame of image data, image data of respective frames including an array of pixel data corresponding to a field of view of the imaging; generating at least one beam forming an aiming pattern visible in the field of view; determining a distance between the scanner system and at least one optical code being imaged; determining a location L of at least one pixel of the array of pixel data that corresponds to the aiming pattern in accordance with the distance determined; and processing at least a portion of a frame of image data acquired during a read operation while the aiming pattern was generated. The processing includes the steps of selecting at least one optical code acquired in the acquired image data that is located at a respective location, wherein the respective location determined during the read operation meets a predetermined condition relative to the location L; and providing the selected at least one optical code for further processing in accordance with the read operation.

BRIEF DESCRIPTION OF THE DRAWINGS

These and other features, aspects, and advantages of the present invention will become better understood with reference to the below listed drawings, and detailed description of the invention.

DETAILED DESCRIPTION OF THE PREFERRED EMBODIMENTS

Figure 1:
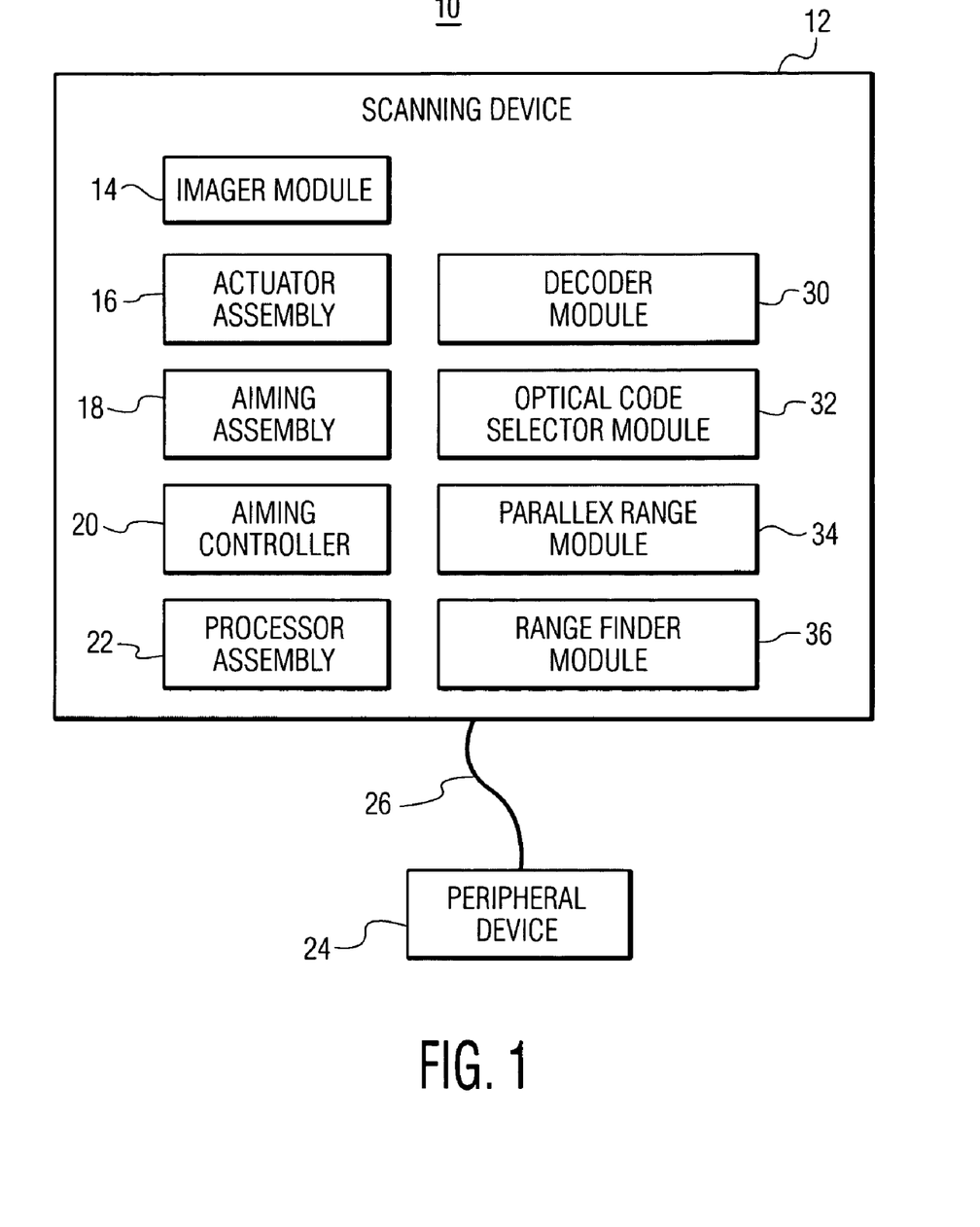
FIG. 1 is a block diagram of an optical scanner system in accordance with the present invention.

In FIG. 1 an optical code scanner system 10 for reading an optical code is shown, where the optical code scanner system 10 includes an imager scanning device 12 for reading an optical code, including imaging optical codes, where more than one optical code may be imaged at a time. The optical code may be for example, a barcode, a UPC/EAN, a one-dimensional or multi-dimensional code, a textual code, etc. "Read" or "Read operation" refers to imaging and decoding an optical code, but may further be understood as imaging and processing an optical code, such as for performing character recognition on the imaged optical code, transmitting or further processing the imaged optical code.

The scanning device 12 includes an imager module 14, an actuator assembly 16, an aiming assembly 18, an aiming controller 20, and a processor assembly 22. The scanning device 12 may be in communication with one or more peripheral devices 24 such as a keyboard, display device, printer device, data storage medium, e.g., including storage for application software and/or databases, at least one remote processing device, e.g., a host processor, and/or another system or a network.

Executable on the processor assembly 20 are a decoder module 30, an optical code selector module 32, a parallax range module 34 and range finder module 36. The optical code selector module selects an optical code from one or more imaged optical codes and provides the selected optical code to the decoder module 30 for decoding thereof and/or for other further processing. Selection of the optical code is made in accordance with the location of the optical code relative to an aiming pattern generated by the aiming assembly 16, as described further below. It is envisioned that the scanning device 12 may operate in a variety of modes, where respective modes use a different method for selecting the optical code(s) to be decoded or otherwise further processed, and where one of the modes uses the method described in accordance with the present invention.

The scanning device 12 may be configured as a handheld or portable device or as a stationary device such as provided in a fixed location, in a rotating turret. Furthermore, the scanning device 12 may be incorporated into a system, such as a local area, cellular or wide area network or a video phone system. Additionally, the scanning device 12 may further be incorporated into another device, such as a PDA or cellular phone.

A coupling 26 is provided for connecting the scanning device 12 to the peripheral device 24. Coupling 26 may include wired or wireless couplings, such as a flexible electrical cable; a radio frequency, optical and/or cellular communication telephone exchange network, either through a modem or an ISDN interface; an infrared data interface (IRDA); a multi-contact shoe; or a docking device. Data transmitted by the coupling 26 may include compressed data.

The peripheral device 24 preferably includes a host processor having at least one data processor, where the at least one data processor may be connected to one or more peripherals or computing devices, such as a video monitor, and/or a network. Analog and/or digital devices may be provided in the host processor and/or the scanning device 12 for processing signals corresponding to sensing of light reflected from a target being imaged or scanned by the scanning device 12. The decoder module 30 may be provided in the peripheral device 24, such as the host processor and/or in the scanning device 12.

The imager module 14 constantly acquires an image corresponding to a field of view (FOV) of the imager module 14, and provides corresponding image data as a series of frames to the processor assembly 22. Included with the imager module 14 is a photo sensor array (not shown) for sensing light reflected from objects lying within the field of view (FOV) of the scanning device 12, and generating an array of electrical signals representing an image which correspond to the sensing. Optics (not shown) may be provided for focusing the light onto the photo sensor array. The photo sensor array may include a CCD or other similar device, such as such as CMOS, a charge modulated device (CMD) or charge injection device (CID) sensors. The imager module 14 may further include circuitry, such as video circuitry, signal processing circuitry, etc., (not shown) for processing (e.g., filtering, buffering, amplifying, digitizing, etc.) the electrical signals for generating image data and interfacing with the processor assembly 22. The processed electrical signals are output periodically (synchronously or asynchronously) as a frame of image data including an array of pixels which correspond to the electrical signals. Accordingly, the imager module 14 outputs a series of frames of image data that correspond to the continual sensing by the photo sensor array. The series of frames are provided to the processor assembly 22, where the frames of image data may be immediately processed and/or stored in order to be available for future processing.

The actuator assembly 16 includes an actuator, such as a trigger or switch (hardware or software), which may be activated by a user, a sensor, a processor, a host processor, etc., for generating an actuation signal upon activation thereof in order to initiate a read operation. The actuation signal may be generated by the host processor and received by the scanning device 12, such as in the form of a command.

The aiming assembly 18 includes at least one light source, such as a laser light source and/or a non-laser light source, e.g., a LED, for generating at least one beam forming an aiming pattern, such as a crosshair, which is visibly projected in an area that corresponds to the field of view of the scanning device 12. The user may aim the scanning device 12 (which may include positioning the target optical code) so that the aiming pattern is situated to coincide with or be close to the target optical code to be imaged. The user aims the scanning device 12 at the target optical code, and then actuates the actuator assembly 16 for initiating a read operation. For example, once the user aims the imaging device by situating the aiming pattern to coincide with or be close to the target optical code. U.S. Pat. No. 5,801,371 describes operation of a scanning device, including generation of an aiming pattern and aiming the scanning device using the aiming pattern, and is incorporated by reference herein in its entirety.

The aiming controller 20 includes circuitry and/or software instructions executable on the processor assembly 22 and/or a data processor of the at least one peripheral device 24 for controlling enablement of the aiming assembly 18 for controlling generation of the aiming pattern during acquisition of at least one frame in response to receipt of the actuation signal. The circuitry may include digital, logic and/or analog devices. The aiming controller 20 may control the aiming assembly 18 so that a frame of image data that was captured while the user was aimed at the target optical code while the aiming pattern was visible is available, as well as a frame of image data that was captured while the user was aimed at the target optical code while the aiming pattern was not visible. The timing of controlling the aiming assembly 18 by the aiming controller 20 is discussed further below.

The processor assembly 22 may include a microprocessor (s), a field programmable gate array (FPGA) and/or other processing device(s), and may further include at least one storage component, such as a flash memory device and/or a DRAM memory device. Further, the processor assembly 22 may communicate with the at least one peripheral device 24, such as the host processor. The processor assembly 22, or portions thereof, may alternatively be provided externally from the imager module 14, such as on another circuit board separate from that which the imager module 14 is provided on, and/or in the host processor. The processor assembly 22 receives the actuation signal when a read operation is initiated, and receives or retrieves respective frames of data of the series of frames upon receipt of the actuation signal for processing thereof.

The decoder module 30, the optical code selector module 32, the parallax range module 34 and at least portions of the aiming controller 20 and the range finder module 36, respectively, include a series of programmable instructions executable on the processor assembly 22 and or another processor external to the scanning device 12, such as the host processor. The series of programmable instructions can be stored on a computer-readable medium, such as RAM, a hard drive, CD, smart card, 3.5" diskette, etc., or transmitted via propagated signals for being executed by the processor assembly 22 for performing the functions disclosed herein and to achieve a technical effect in accordance with the invention. The processor assembly 22 is not limited to the software modules described. The functions of the respective software modules may be combined into one module or distributed among a different combination of modules.

The decoder module 30 receives optical codes or portions thereof and performs a decode operation on the respective codes and outputs a corresponding decoded code. It is contemplated that when receiving a partial code, the decoder module 30 may retrieve another portion of the code as needed for decoding thereof. The decode operation may include decoding a barcode or other type of symbol, such as a text code including alphanumeric characters. The decoding process may include character recognition processing.

Figure 2A:
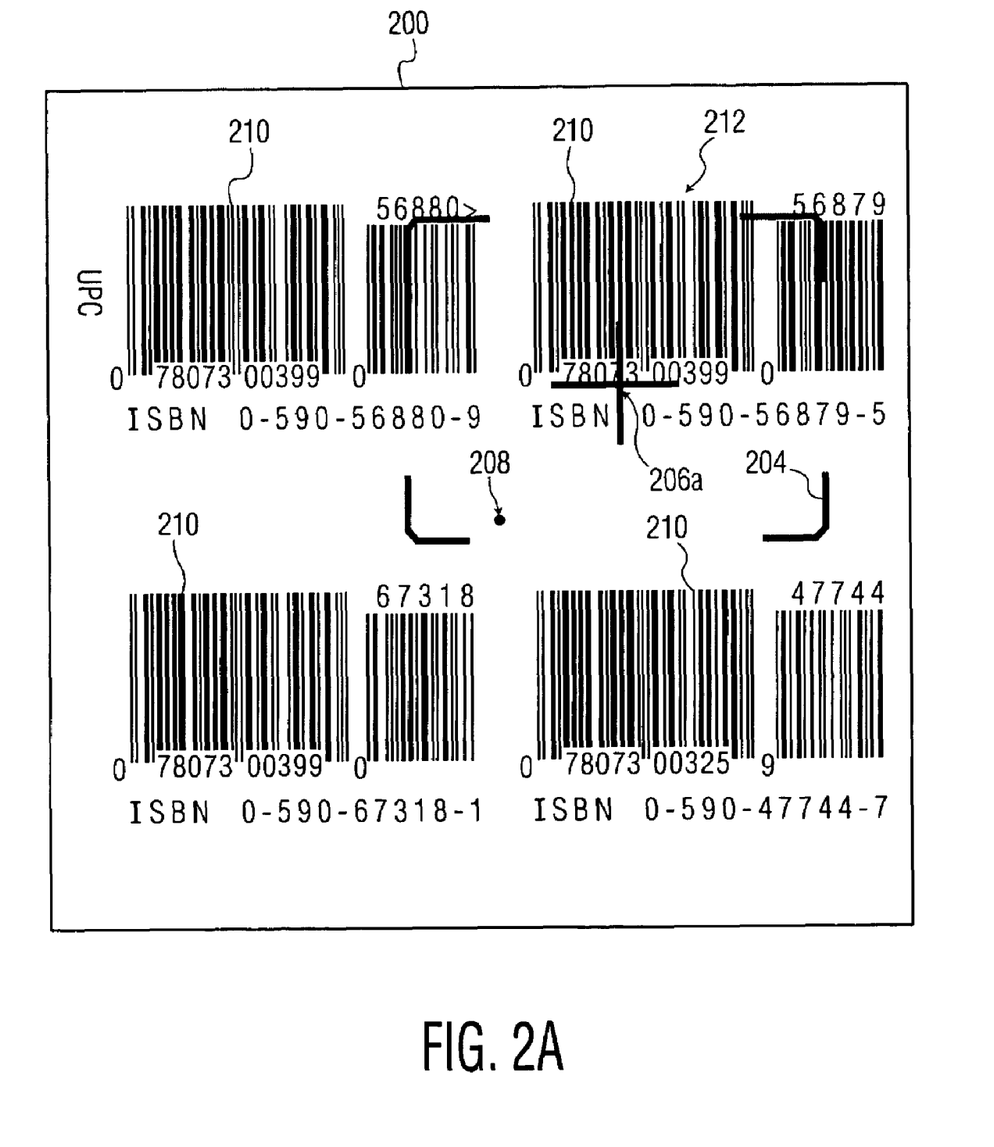
FIG. 2A is a diagram of an exemplary first frame of image data imaged in which an aiming pattern is acquired in accordance with the present invention.
Figure 2B:
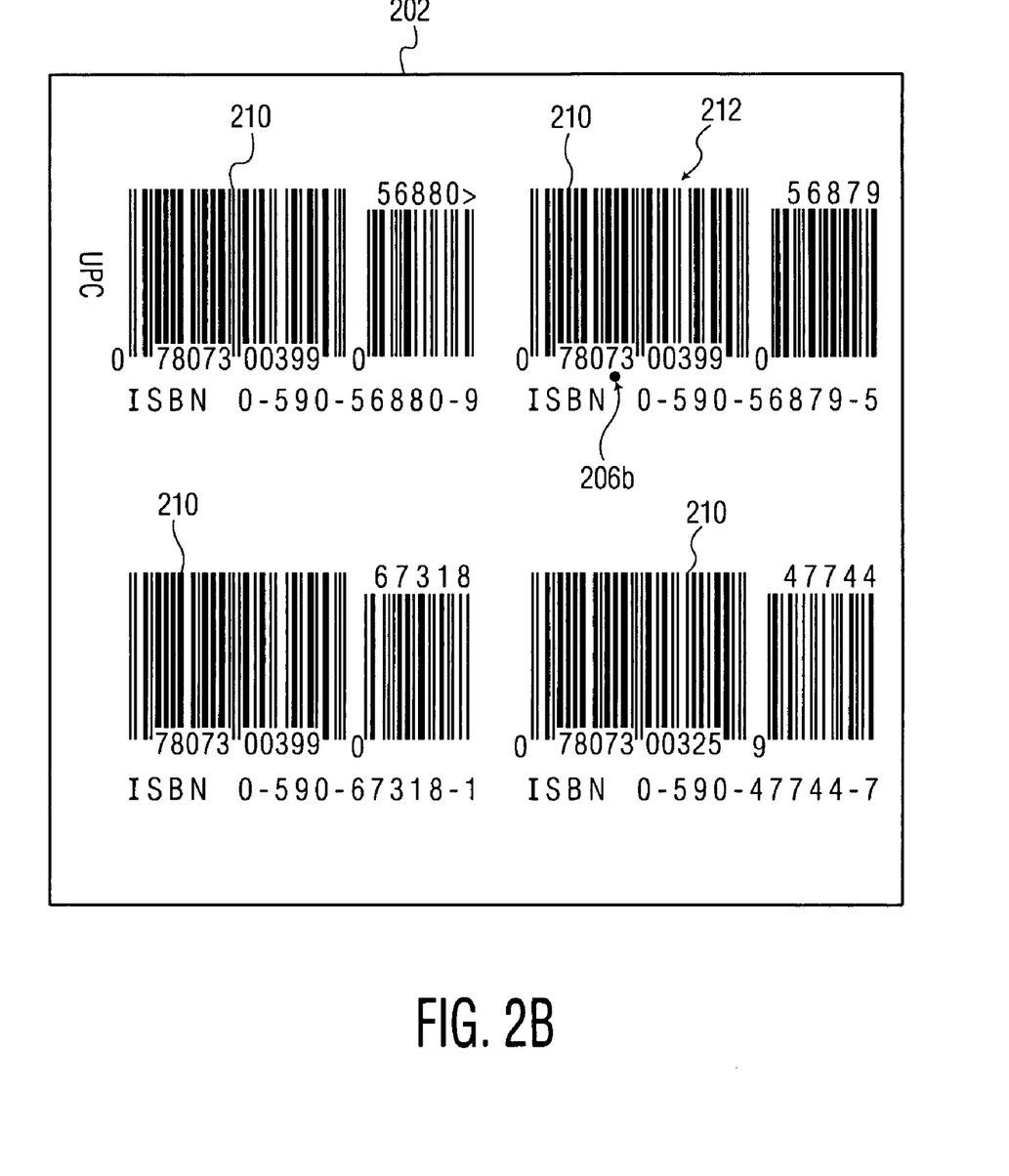
FIG. 2B is a diagram of an exemplary second frame of image data imaged in which an aiming pattern is not acquired in accordance with the present invention.

In one embodiment of the invention the optical code selector module 32, in response to receipt of the actuation signal, processes at least a portion of at least a first and second frame of image data. Exemplary first and second frames 200 and 202 are shown in FIGS. 2A and 2B, respectively. During the imaging process the user aims the aiming pattern 204 at the target optical code 212. The first frame of image data 200 is acquired while the aiming pattern 204 is generated and visible, so that the aiming pattern 204 was captured during acquisition of the first frame of image data. In the example shown, several optical codes 210 are acquired, but optical code 212 is the optical code that the user wants decoded.

A determination is made of the location L of at least one pixel 206*a* of the array of pixels of the first frame that corresponds to the aiming pattern 204, e.g., the center of the aiming pattern 204. The pixel that corresponds to the center of the array of pixels associated with the FOV of the imaging device 14 is shown as point 208. In the exemplary image acquisition, the pixel 206a at the center of the aiming pattern 204 does not coincide with the pixel located at point 208. In commercially available scanning devices it is common for the center of the aiming pattern to not coincide with the center of the FOV of the scanning device 12 due to mechanical or manufacturing inconsistencies, such as manufacturing process variations and mechanical tolerances.

FIG. 2B shows a second frame of image data 202 acquired while the aiming pattern is not generated and is not visible. As the user aims the imaging device and pulls the trigger, frames 200 and 202 are acquired in rapid sequence, preferably with frame 200 acquired immediately prior to frame 202, but not limited thereto. For image acquisition having a conventional rate of 30 frames/sec, frames 200 and 202 may be acquired approximately 33 msec apart from each other. Due to the rapid successive acquisitions of frames 200 and 202 as the user aims the scanning device 12, the FOV captured for frames 200 and 202 is substantially the same.

The aiming pattern 204 was not captured during acquisition of the second frame of image data 202, but the location of the aiming pattern, specifically the center of the aiming pattern can be determined based on the location L of pixel 206a in the first frame 200. The pixel 206b of the array of pixels of frame 202 is determined which is located at location L, i.e., the location of pixel 206a as determined from the first frame 200. The target optical code 212 is selected from the other optical codes 210, where optical code 210 that is located nearest to pixel 206b. Optical code 212 is provided to the decoder module 30 for decoding thereof. Alternatively, optical codes, or portions thereof, that were found within a vicinity of (e.g., within a predetermined distance from) pixel 206b are further processed, such as for decoding thereof. Where a portion of an optical code lies within the vicinity of pixel 206b, the portion may be processed and/or remaining portions of the optical code may be processed, which may depend, for example, upon how significant a portion of the optical code was located within the vicinity.

Figure 3:
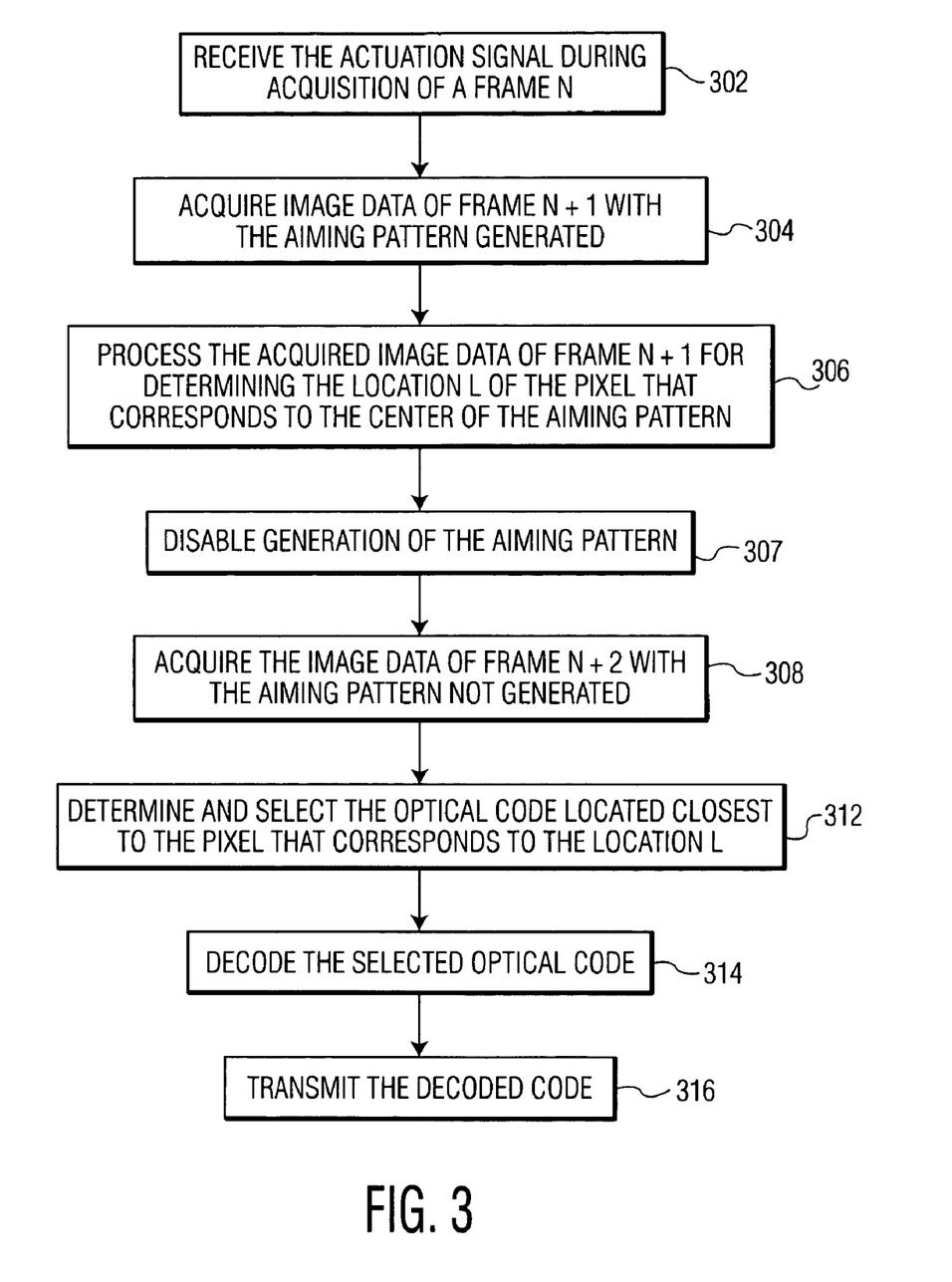
FIG. 3 is flowchart of steps of a method of processing an optical code aimed at by an imager scanning device in accordance with an embodiment of the invention.

With reference to FIGS. 1, 2 and 3, an embodiment of a method in accordance with the present invention is shown. The scanning device 12 is in an aiming state, where the aiming pattern is generated and visible, so that the user may use the aiming pattern to aim the imager device so that the aiming pattern may be trained to coincide with a target optical code or be near the target optical code. A user of the scanning device 12 aims the scanning device 12 at the target optical code and activates the actuator assembly 16. As the actuator assembly 16 is activated the imager module 14 is acquiring a series of frames.

At step 302, the processor assembly 22 receives the actuation signal during acquisition of a frame N. At step 304, image data of frame N+1 is acquired with the aiming pattern generated, so that the aiming pattern is acquired in the image data. At step 306, at least a portion of the acquired image data of frame N+1 is processed by the optical code selector module 32 for determining the location L of the pixel 206a that corresponds to the center of the aiming pattern. The location L may be described by coordinates, e.g., (x,y).

At step 307, the generation of the aiming pattern is disabled. At step 308, the image data of frame N+2 is acquired with the aiming pattern disabled (not generated), so that the aiming pattern is not acquired in the image data. At step 312, at least a portion of the image data of frame N+2 is processed by the optical code selector module 32 for determining and selecting the optical code 212 located closest to a pixel 206b located at location L. Alternatively, optical codes are selected when the respective optical codes or a portion thereof, are found within a vicinity of (e.g., within a predetermined distance from) pixel 206b. At step 314, the selected optical code(s) or portions thereof (e.g., optical code 212) are processed, e.g., decoded by the decoder module 30. At step 316, the processed, e.g., decoded, code is transmitted, such as to the at least one peripheral device 24, e.g., the host processor and/or a display device.

In the embodiment shown, as described above, step 302 occurs at frame N. Preferably, step 304 is performed during acquisition of frame N+1. Step 306 is performed during acquisition of frame N+1 and/or during acquisition of frame N+2. Steps 308 and 312 are performed during acquisition of frame N+2, and step 314 is performed at the beginning of acquisition of frame N+3. Steps 306, 312 and/or 314 may be performed at substantially the same time that image data is being acquired. It is contemplated that one or more combination of the steps described may be performed in parallel.

Figure 4:
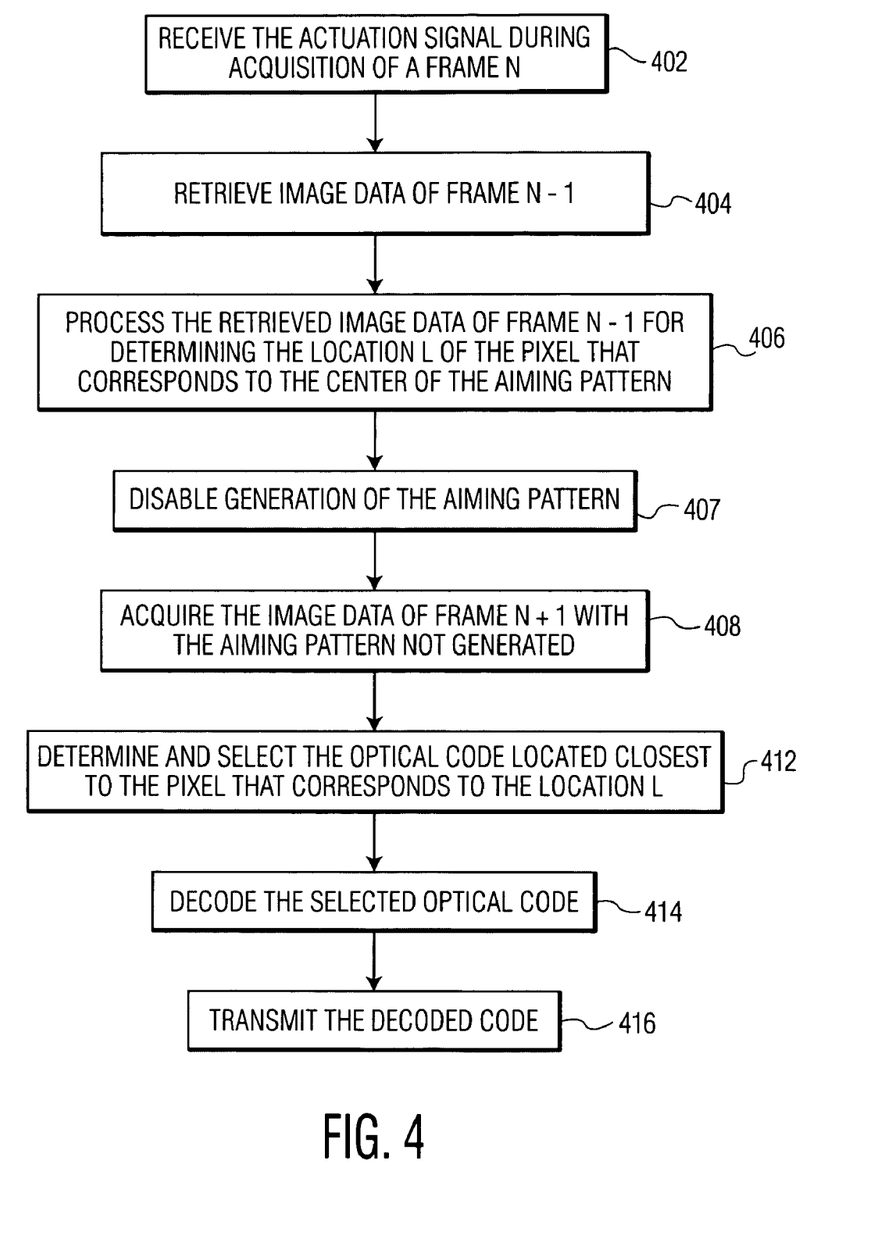
FIG. 4 is a flowchart of steps of a method of processing an optical aimed at by an imager scanning device in accordance with another embodiment of the invention.

In another embodiment, with reference to FIGS. 1, 2 and 4, a method in accordance with the present invention is shown. The scanning device 12 is in an aiming state. The user aims the scanning device 12 at a target optical code and activates the actuator assembly 16. At step 402, the processor assembly 22 receives the actuation signal during acquisition of a frame N. At step 404, at least a portion of the image data of frame N−1 is retrieved from a storage medium where previously acquired frames of image data are stored. Frame N−1 is the frame which occurred prior to activation of the actuator assembly 16. Since frame N−1 occurred prior to activation of the actuator assembly 16, it is likely that the user was aimed at the target optical code and preparing to activate the actuator assembly 16. The aiming pattern was generated during acquisition of frame N−1, and accordingly the aiming pattern is acquired in the image data. At step 406, at least a portion of the acquired image data of frame N−1 is processed by the optical code selector module 32 for determining the location L of the pixel 206a that corresponds to the center of the aiming pattern.

At step 407, the generation of the aiming pattern is disabled. At step 408, the image data of frame N+1 is acquired with the aiming pattern disabled (not generated), so that the aiming pattern is not acquired in the image data. At step 412, at least a portion of the image data of frame N+2 is processed by the optical code selector module 32 for determining and selecting the optical code 212 located closest to a pixel 206b located at location L. Alternatively, optical codes are selected when the respective optical codes or a portion thereof, are found within a vicinity of (e.g., within a predetermined distance from) pixel 206b. At step 414, the selected optical code(s) or portions thereof (e.g., optical code 212) are processed, e.g., decoded by the decoder module 30. At step 416, the processed, e.g., decoded, code is transmitted, such as to the at least one peripheral device 24, e.g., the host processor and/or a display device.

In the embodiment shown, as described above, step 402 occurs during acquisition of frame N, and steps 404, 406 and 407 are performed during acquisition of frame N. Steps 408 and 412 are performed during acquisition of frame N+1, and step 414 is performed at the beginning of acquisition of frame N+2. Steps 406, 412 and/or 414 may be performed at substantially the same time that image data is being acquired. It is contemplated that one or more combination of the steps described may be performed in parallel.

It is contemplated that at steps 304, 306, 308, 312 with reference to FIG. 3, and steps 404, 406, 408, 412 with reference to FIG. 4, the image data acquired or processed includes a portion of image data corresponding to the particular frame, and that several iterations may be performed for acquiring and/or processing respective successive portions of image data corresponding to the particular frame and attempting to locate the location L, the target optical code 212 and/or perform a decode operation on the selected target optical code 212, until a condition is met, such as a successful completion of the step being performed, a sufficient number of processing attempts are performed on the particular frame, or a timeout condition occurs. Processing of the successive portions may be in accordance with availability of image data as it is acquired or the portions of the image data may be selected in accordance with design choice. Retrieval of image data acquired in a frame prior to activation of an actuator is described in U.S. patent application Ser. No. 10/901,623 filed Jul. 29, 2004, the entirety of which is incorporated herein by reference.

In accordance with the methods shown with respect to FIG. 3 or 4, a dynamic calibration is performed upon respective activations of the actuation assembly 16 for properly determining the optical code that the scanning device 12 was aimed at. The dynamic calibration overcomes variations due to any tolerances or variances, such as those associated with manufacturing.

In another embodiment of the invention, the location L of the pixel associated with the center of the aiming pattern is stored for respective determinations of location L, e.g., for respective read operations. The optical code selector module retrieves at least one stored location L and calculates a location CL in accordance with at least one function of the retrieved at least one stored location L. Preferably the at least one function includes calculating an average of the respective retrieved at least one stored location L.

Calculated location CL is calculated and updated as new determinations of location L are determined and stored. Storage of newly determined locations L and/or updating of the calculated location CL may be performed for each read operation or may be performed at regular or irregular intervals. The storage medium used for storing values for L and CL is nonvolatile and may be included with the processing assembly 22 or accessible by the processing assembly 22. It is further contemplated that the processing, and storing of L and CL may be performed by the host processor.

The calculated location CL may be used in lieu of determining L, such as for a read operation in which the aiming pattern was generated during image acquisition, but the optical code selector module 32 determines that the position of the aiming pattern cannot be recovered in the processing of the acquired image data, e.g., the optical code selector module 32 doesn't succeed in sufficiently finding or processing the aiming pattern while processing the acquired image data This may occur when the aiming pattern is not detectable within the image data or was not sufficiently acquired. An exemplary situation in which the aiming pattern may not be detectable or sufficiently acquired is when the read operation is performed in bright ambient light conditions.

In another embodiment of the invention, once the calculated location CL has been established, the calculated location CL is used for selecting the optical code that is being aimed at. A method for determining whether the calculated location CL has been established or not is described further below. If it is determined that the calculated location CL has not been established, then L must be determined, such as by using the method in accordance with FIG. 3 or FIG. 4.

When the calculated location CL has been established, a read operation is performed by immediately disabling generation of the aiming pattern by the aiming controller 20 in response to receipt of the actuation signal. A first frame of image data is acquired with the aiming pattern disabled. The optical code selector module 32 processes the image data using the calculated location CL as the center of the aiming pattern in lieu of determining the location of the pixel that corresponds to the center of the aiming pattern and selects the optical code(s) that are located at a respective location, where the respective location relative to the calculated location CL meets a predetermined condition.

The selected data may be transmitted for further processing, e.g., decoding, or the calculated location CL may be verified as follows. After acquiring image data with the aiming pattern disabled, generation of the aiming pattern is enabled by the aiming controller 20, and a second frame of image data is acquired with the aiming pattern generated so that the aiming pattern is acquired with the second frame of image data. The second frame of image data is processed by the optical code selector module 32 for determining the location L of the pixel that corresponds to the center of the aiming pattern. When the newly determined L is sufficiently close to the calculated location CL, e.g., any difference between CL and L is less than a predetermined threshold value it is not necessary to acquire the full second frame of image data, since processing, e.g., decoding, of optical codes is performed on image data from the first frame of data. Otherwise, the image data of the second frame is processed for selecting and processing the optical code that is located at a respective location, where the respective location relative to the determined location L meets a predetermined condition.

As mentioned above, determination of whether CL is established or not, may be performed during previous read operations, such as by comparing a recently determined value for CL or L with a previously determined value for CL or L. CL may be determined to be established if the difference between the compared values is less than a predetermined threshold value.

In another embodiment of the invention, a parallax range module 34 is provided which processes previously determined values for L, including tracking changes in L attributed to factors such as parallax, where the position of the aiming pattern depends on the distance between the target being imaged and the scanner system 10, and more particularly the scanning device 12. A range of possible values for L is established. Outside values for the range of possible L values correspond to outside values for a range of operational distances, where an operational distance is a distance between the scanning system, and more particularly the scanning device 12 (e.g., the photo sensor array thereof) and the target at which a successful read operation is attainable. As the outside values for the range of operational distances are established the outside values for the range of possible L values may be determined either empirically and/or by calculations, as described below.

There are a variety of ways that the outside values for the range of operational distances may be established. For example, the outside values for the range of operational distances may be established empirically where only operational distances associated with successful read operations are used for determining outside values thereof. Furthermore, the outside values for the range of operational distances for the scanning device 12 may be known for the particular model being used, or may be calculated based on specifications and geometries of the scanner system 10, and more particularly the scanning device 12.

Similarly, there are a variety of ways that the outside values of the range of possible values of L may be established. For example, maximum and minimum values of historical values of L based on normal use of the scanning device 12 may be determined. Furthermore, the scanning device 12 may be operated by a user to test the outside limits of the scanning device 12, such as by scanning targets that are located at minimum and maximum operational distances from the scanning device 12 and storing the corresponding values of L. The historical values for L may include only values of L that were determined in association with a successful read operation. Furthermore, outside values for the range of possible values of L may also (or alternatively) be established based on calculations, which may include using knowledge about the specifications and geometries of the scanner system, and more particularly the scanning device 12.

During a read operation, a frame of image data is acquired without the aiming pattern being generated so that the aiming pattern is not captured with the image data. Pixels associated with the range of possible values of L are located and established as a cluster of center pixels corresponding to the range of possible values of L. A neighborhood of pixels located within a pre-established threshold distance from the cluster of center pixels are processed for finding optical codes. Optical codes, or portions thereof, that were found within the neighborhood of pixels are further processed, such as for decoding thereof. Where a portion of an optical code lies within the neighborhood of pixels, the portion may be processed and/or remaining portions of the optical code may be processed, which may depend upon how significant a portion of the optical code was located within the neighborhood of pixels.

In another embodiment of the invention, the system 10 further includes range finder module 36 including circuitry and/or executable instructions for determining the distance between the scanning device 12, e.g., the photo sensor array of the scanning device 12, and the target being imaged. A variety of systems and methods for determining a distance between a target being imaged and a scanning device are known. For example, such a system is described in U.S. Pat. No. 6,340,114 B1 and copending U.S. application Ser. No. 10/425,499, filed Apr. 29, 2003, both of which are assigned to Symbol Technologies, Inc., and both of which are incorporated herein by reference in their entirety.

During a read operation, a frame of image data is acquired without the aiming pattern being generated so that the aiming pattern is not captured with the image data. The parallax range module 34 calculates the position L of the center of the aiming pattern using the distance determined by the range finder module 36 and the specific geometry of the scanning device 12, e.g., the geometry of the imager module 14. Optical codes, or portions thereof, that were found within a vicinity of (e.g., within a predetermined distance from) the pixel that corresponds to the calculated position L are further processed, such as for decoding thereof. Where a portion of an optical code lies within the vicinity of the pixel corresponding to position L, the portion may be processed and/or remaining portions of the optical code may be processed, which may depend upon how significant a portion of the optical code was located within the vicinity.

It is contemplated that the target being imaged may not be an optical code, but may be a non-code entity positioned near other entities that may be in the field of view. The described aiming technique helps to select the desired entity from the others for further processing thereof, which may be other than decoding, such as transmission, character recognition, image processing, etc.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. An optical code scanner system for reading at least one optical code comprising:
   an imager module for acquiring a series of at least one frame of image data, image data of respective frames including an array of pixel data corresponding to imaging of a field of view of the imager module;
   an aiming assembly having at least one light source for generating at least one beam forming an aiming pattern visible in the field of view;
   an aiming controller for controlling the aiming assembly for controlling generation of the aiming pattern during acquisition of at least one frame of image data in response to receipt of an actuation signal indicating initiation of a read operation;
   an optical code selector module executable on at least one processor for performing in accordance with a read operation processing of at least a portion of a first frame of image data acquired while the aiming pattern was generated for determining a location of a pixel of the array of pixel data that is a digital representation of a photosensitive sensor pixel as illuminated by the aiming pattern during acquisition of the first frame, wherein the photosensitive sensor pixel is included in the imager module for imaging the field of view of the imager module; and
   processing of at least a portion of a second frame of image data of the at least one frame of image data acquired while the aiming pattern was not generated, including selecting at least one optical code acquired in the acquired image data that is located at a respective location, wherein the respective location meets a predetermined condition relative to a second digital representation of the photosensitive sensor pixel in the second frame of image data as determined utilizing the determined location, and providing the selected at least one optical code for further processing in accordance with the read operation, wherein the second frame of image data does not include the image of the aiming pattern.

2. The system according to claim 1, wherein the second frame is acquired after the first frame.

3. The system according to claim 1, wherein the system further comprises a decoder module executable on the processor assembly for performing a decode operation for decoding the selected at least one optical code.

4. The system according to claim 1, wherein for a respective at least one read operation the determined location is stored; and
   the optical code selector module retrieves at least one stored location and calculates a position in accordance with at least one function of the retrieved at least one stored location.

5. The system according to claim 4, wherein the at least one function includes averaging the at least one stored location.

6. The system according to claim 4, wherein for a subsequent read operation the optical code selector module:
   processes at least a portion of a first frame of image data acquired while the aiming pattern was generated and determines that the position of the aiming pattern cannot be recovered in the processing of the at least a portion of the first frame of image data;
   processes at least a portion of a second frame of image data acquired while the aiming pattern was not generated including selecting at least one optical code acquired in the acquired image data that is located at a respective location, wherein the respective location meets a predetermined condition relative to the calculated location; and provides the selected at least one optical code for further processing in accordance with the read operation.

7. The system according to claim 4, wherein during a subsequent read operation the optical code selector module processes a frame of image data acquired while the aiming pattern was not generated using the calculated location without processing a frame of image data acquired while the aiming pattern was generated, including selecting at least one optical code acquired in the acquired image data that is located at a second respective location, wherein the second respective location meets a predetermined condition relative to the calculated location.

8. The system according to claim 7, wherein during the subsequent read operation:
the optical code selector module determines if the calculated location is well established;
the frame of image data during subsequent read operation is processed using the calculated location only when the calculated location is determined to be well established, in which case the selected at least one optical code is provided for further processing in accordance with the subsequent read operation; and
when the calculated location is not determined to be well established, during the subsequent read operation a first frame of image data acquired while the aiming pattern was generated is processed for determining a location of at least one pixel of the array of pixel data that corresponds to the aiming pattern; and a second frame of image data acquired while the aiming pattern was not generated is processed, including selecting at least one optical code acquired in the acquired image data that is located at a respective location, wherein the respective location meets a predetermined condition relative to the determined location, and provides the selected at least one optical code for further processing in accordance with the subsequent read operation.

9. The system according to claim 8, wherein determination if the calculated location is well established includes determining if a difference between a recently calculated location and a previously calculated location are below a predetermined threshold level.

10. The system according to claim 7, wherein during the subsequent read operation the aiming controller immediately controls the aiming assembly to disable generation of the aiming pattern in response to receipt of the actuation signal for acquiring the frame of image data.

11. The system according to claim 7, wherein during the subsequent read operation following acquisition of the frame of image data:
the aiming controller controls the aiming assembly to generate the aiming pattern to acquire a second frame of image data;
the optical code selector module processes at least a portion of the second frame of image data for determining a location of at least one pixel of the array of pixel data that corresponds to the aiming pattern acquired in the second frame of image data;
the optical code selector module compares the location determined for the second frame of image data with the calculated location, and if the difference between the compared values is below a threshold value provides the selected at least one optical code for further processing in accordance with the subsequent read operation; and otherwise selects at least one optical code acquired in the second frame of image data that is located at a respective location, wherein the respective location for the second frame of image data meets a predetermined condition relative to the determined location, and provides the selected at least one optical code for further processing in accordance with the subsequent read operation.

12. The system according to claim 1, wherein:
the system further comprises a parallax range module which determines a range of locations of at least one pixel of the array of pixel data that corresponds to the aiming pattern in accordance with a range of operational distance values associated with the scanner system; and
for a subsequent read operation the optical code selector module processes at least a portion of a frame of image data acquired while the aiming pattern was not generated and determines a cluster of pixels of the image data acquired during the subsequent read operation that corresponds to the range of locations, including selecting at least one optical code acquired with the image data acquired during the subsequent read operation that is located at a second respective location, wherein the respective location meets a predetermined condition relative to the range of locations, and provides the selected at least one optical code for further processing in accordance with the subsequent read operation.

13. The system according to claim 1, wherein the aiming pattern includes first and second lines forming a crosshair and the determined location is the intersection of the first and second lines of the crosshair.

14. An optical code scanner system for reading at least one optical code comprising:
an imager module for acquiring a series of at least one frame of image data, image data of respective frames including an array of pixel data corresponding to imaging of a field of view of the imager module, wherein a first frame of the at least one frame of the image data includes an image of an aiming pattern and a second frame of the at least one frame of the image data does not include the image of the aiming pattern;
an aiming assembly having at least one light source for generating at least one beam forming the aiming pattern visible in the field of view;
a range finder module for determining at least one distance between the scanner system and at least one optical code being imaged;
a parallax range module for determining a range of a location of a pixel of the array of pixel data that is a digital representation of a photosensitive sensor pixel as illuminated by the aiming pattern during acquisition of the first frame in accordance with the at least one distance determined by the range finder module, wherein the photosensitive sensor pixel is included in the imager module for imaging the field of view of the imager module; and
an optical code selector module executable on at least one processor for processing at least a portion of the first frame of image data acquired during a read operation while the aiming pattern was generated for determining the location of the pixel of the array of pixel data that is a digital representation of a photosensitive sensor pixel as illuminated by the aiming pattern during acquisition of the first frame and selecting at least one optical code acquired in the acquired image data that is located at a respective location, wherein the respective location determined during the read operation meets a predetermined condition relative to a second digital representation of the photosensitive sensor pixel in the second frame of image data as determined utilizing the determined location, and providing the selected at least one optical code for further processing in accordance with the read operation.

15. The system according to claim 14, wherein the aiming pattern includes first and second lines forming a crosshair and determined location L is the intersection of the first and second lines of the crosshair.

16. A method for reading at least one optical code comprising the steps of:
imaging a field of view including acquiring a series of at least one frame of image data, image data of respective frames including an array of pixel data corresponding to a field of view of the imaging;
generating at least one beam forming an aiming pattern visible in the field of view;
controlling generation of the aiming pattern during acquisition of at least one frame of image data in response to receipt of an actuation signal indicating initiation of a read operation; and
performing a read operation comprising the steps of:
processing at least a portion of a first frame of image data acquired while the aiming pattern was generated for determining a location of a pixel of the array of pixel data that is a digital representation of a photosensitive sensor pixel as illuminated by the aiming pattern during acquisition of the first frame, wherein the photosensitive sensor pixel is included in an imager module for imaging the field of view of the imager module; and
processing at least a portion of a second frame of image data of the at least one frame of image data acquired while the aiming pattern was not generated, wherein the second frame of the image data does not include the image of the aiming pattern, comprising the steps of:
selecting at least one optical code acquired in the acquired image data that is located at a respective location; wherein the respective location meets a predetermined condition relative to a second digital representation of the photosensitive sensor pixel in the second frame of image data as determined utilizing the determined location; and
providing the selected at least one optical code for further processing in accordance with the read operation.

17. The method according to claim 16, further comprising the steps of:
storing the determined location for a respective at least one read operation;
retrieving at least one stored location; and
calculating a position in accordance with at least one function of the retrieved at least one stored location.

18. The method according to claim 17, wherein the at least one function includes averaging the at least one stored location.

19. The method according to claim 17, further comprising the steps of:
processing a frame of image data acquired while the aiming pattern was not generated during a subsequent read operation using the calculated location without processing a frame of image data acquired while the aiming pattern was generated, comprising the step of:
selecting at least one optical code acquired in the acquired image data that is located at a second respective location, wherein the second respective location meets a predetermined condition relative to the calculated location.

20. The method according to claim 19, further comprising the steps of:
determining if the calculated location is well established;
when the calculated location is determined to be well established:
processing the frame of image data during the subsequent read operation using the calculated location; and;
providing the selected at least one optical code for farther processing in accordance with the subsequent read operation; and
when the calculated location is not determined to be well established:
processing a first frame of image data acquired while the aiming pattern was generated during the subsequent read operation comprising the steps of:
determining a location of at least one pixel of the array of pixel data that corresponds to the aiming pattern; and
processing a second frame of image data acquired while the aiming pattern was not generated, comprising the steps of:
selecting at least one optical code acquired in the acquired image data that is located at a respective location, wherein the respective location meets a predetermined condition relative to the determined location; and
providing the selected at least one optical code for further processing in accordance with the subsequent read operation.

21. The method according to claim 17, further comprising the steps of:
determining the location of at least one pixel of the array of pixel data for respective subsequent read operations;
storing the respective determined locations as the locations are determined; and
updating calculated location using the most recently stored location.

22. The method according to claim 16, further comprising the steps of:
determining a range of locations of at least one pixel of the array of pixel data that corresponds to the aiming pattern in accordance with a range of operational distance values associated with the imaging; and
processing at least a portion of a frame of image data acquired while the aiming pattern was not generated during a subsequent read operation for determining a cluster of pixels of the image data acquired during the subsequent read operation that corresponds to the range of locations, comprising the steps of:
selecting at least one optical code acquired in the image data acquired during the subsequent read operation that is located at a second respective location, wherein the second respective location meets a predetermined condition relative to the range of locations; and
providing the selected at least one optical code for further processing in accordance with the subsequent read operation.

23. The method according to claim 16, wherein the aiming pattern includes first and second lines forming a crosshair and the determined location is the intersection of the first and second lines of the crosshair.

24. A method for reading at least one optical code comprising the steps of:
imaging with a scanning system a field of view including acquiring a series of at least one frame of image data, image data of respective frames including an array of pixel data corresponding to a field of view of the imaging, wherein a first frame of the at least one frame of the image data includes an image of an aiming pattern and a second frame of the at least one frame of the image data does not include the image of the aiming pattern;

generating at least one beam forming the aiming pattern visible in the field of view;

determining at least one distance between the scanner system and at least one optical code being imaged;

determining a range of a location of at least one pixel of the array of pixel data that is a digital representation of a photosensitive sensor pixel as illuminated by the aiming pattern in accordance with the at least one distance determined during acquisition of the first frame; and processing at least a portion of the first frame of image data acquired during a read operation while the aiming pattern was generated for determining the location of at least one pixel of the array of pixel data that is the digital representation of the photosensitive sensor pixel as illuminated by the aiming pattern during acquisition of the first frame, comprising the steps of:

selecting at least one optical code acquired in the acquired image data that is located at a respective location, wherein the respective location determined during the read operation meets a predetermined condition relative to a second digital representation of the photosensitive sensor pixel in the second frame of image data as determined utilizing the determined location; and providing the selected at least one optical code for further processing in accordance with the read operation.

25. The method according to claim 24, wherein the aiming pattern includes first and second lines forming a crosshair and the determined location is the intersection of the first and second lines of the crosshair.

* * * * *

UNITED STATES PATENT AND TRADEMARK OFFICE
CERTIFICATE OF CORRECTION

| | | |
|---|---|---|
| PATENT NO. | : 7,478,753 B2 | Page 1 of 1 |
| APPLICATION NO. | : 10/931150 | |
| DATED | : January 20, 2009 | |
| INVENTOR(S) | : Patel et al. | |

It is certified that error appears in the above-identified patent and that said Letters Patent is hereby corrected as shown below:

ON THE FACE PAGE

On the Face Page, in Field (56) under "FOREIGN PATENT DOCUMENTS", in Column 2, Line 2, delete "WO PCT/US2005/029818".

IN THE SPECIFICATION

In Column 9, Line 17, delete "FIG." and insert -- FIGS. --, therefor.

IN THE CLAIMS

In Column 15, Line 7, in Claim 15, after "location" delete "L".

In Column 16, Line 8, in Claim 20, delete "farther" and insert -- further --, therefor.

Signed and Sealed this

Twenty-fourth Day of November, 2009

David J. Kappos
*Director of the United States Patent and Trademark Office*